US012176649B2

(12) United States Patent
Chen

(10) Patent No.: US 12,176,649 B2
(45) Date of Patent: Dec. 24, 2024

(54) COUPLING ELECTRONIC SEAL

(71) Applicant: Chih-Chuan Chen, Nantou (TW)

(72) Inventor: Chih-Chuan Chen, Nantou (TW)

( * ) Notice: Subject to any disclaimer, the term of this patent is extended or adjusted under 35 U.S.C. 154(b) by 254 days.

(21) Appl. No.: 17/864,375

(22) Filed: Jul. 13, 2022

(65) Prior Publication Data

US 2024/0022016 A1 Jan. 18, 2024

(51) Int. Cl.

*H01R 13/52* (2006.01)
*H01Q 1/12* (2006.01)
*H01R 13/595* (2006.01)

(52) U.S. Cl.

CPC ......... *H01R 13/5202* (2013.01); *H01Q 1/125* (2013.01); *H01R 13/595* (2013.01); *H01R 2201/24* (2013.01)

(58) Field of Classification Search

CPC .............. H01R 13/5202; H01R 13/595; H01R 2201/24; H01Q 1/125; H01Q 1/20; H01Q 9/18; H01Q 9/32; G09F 3/0335; G09F 3/0317

USPC ...................................................... 340/572.8

See application file for complete search history.

(56) References Cited

U.S. PATENT DOCUMENTS

| | | | | |
|---|---|---|---|---|
| 10,510,272 | B1 * | 12/2019 | Chen | G09F 3/0335 |
| 10,916,161 | B1 * | 2/2021 | Chen | G09F 3/0329 |
| 2016/0168877 | A1 * | 6/2016 | Chen | G09F 3/0317 70/14 |
| 2020/0386009 | A1 * | 12/2020 | Chen | E05B 39/00 |

* cited by examiner

*Primary Examiner* — Omar Casillashernandez
(74) *Attorney, Agent, or Firm* — Leong C. Lei

(57) ABSTRACT

The present invention includes a plug bolt and a bolt seat. The plug bolt includes a bolt pin having a receiving hole that receives a circuit device including an RFID chip electrically connected with a main circuit and a radiation unit. The receiving hole defines a hole body arranged in an axial direction, and an open hole bottom at a bottom of the hole body. The main circuit includes a lower contact point. The radiation unit induces an effect of coupling feed with respect to the hold body to make the bolt pin forming an upper monopole antenna. The bolt seat includes a lower monopole antenna and a locking hole into which the bolt pin is insertable. When the lower monopole antenna is electrically connected with the lower contact point, the upper and lower monopole antennas jointly form a standard dipole antenna to emit a signal that is monitorable.

12 Claims, 8 Drawing Sheets

COUPLING ELECTRONIC SEAL

TECHNICAL FIELD OF THE INVENTION

The present invention relates to an electronic seal in which a bolt pin is arranged to form a monopole antenna by means of an effect of coupling feed of a radiation unit.

DESCRIPTION OF THE PRIOR ART

A prior art device disclosed in U.S. Pat. No. 9,508,271 issued to the present inventor includes a bolt pin, a circuit device, and an upper lid. The circuit device has a lower contact point that is exposed outside the bolt pin in order to electrically connect a lower monopole antenna arranged in a bolt seat when the bolt pin locks up the bolt seat for closure of a door latch of a cargo container and to issue a signal that can be monitored by a custom host device. At the moment, the circuit device switches to connecting with the upper lid, which is feeding through direct contact, in order to have the bolt pin form an upper monopole antenna for enhancing the signal.

However, such a prior art device has the following shortcomings to be further improved:

(1) A structure arrangement exhibiting accurate separation and recontact must be set between the circuit device and the upper lid in order to control timing of the bolt pin forming the upper monopole antenna. Such a structure arrangement makes the entire production cost uneconomic.

(2) When the bolt pin forms the upper monopole antenna, electrical connection to the upper lid is made through a top end of the circuit device, so that the bolt pin is of an inverted L-shaped antenna arrangement that emits a signal from the top end toward a lower side, and when it is put in operation in combination with the lower monopole antenna, a non-standard dipole antenna is formed, of which an antenna gain is far smaller than a standard dipole antenna arrangement, so as to suffer a disadvantage of a reading distance being not enough.

SUMMARY OF THE INVENTION

The contents of the present invention are as follows:

(1) The present invention provides a circuit device that comprises a radiation frequency circuit in a receiving hole of a bolt pin, and the circuit device is electrically connected with a radiation unit, and the radiation unit and a hole body of the receiving hole generate an effect of coupling feed so as to transmit an electromagnetic wave signal by means of frequency response to thereby make the bolt pin forming an upper monopole antenna of the circuit device. As such, instability of a production process of the prior art device in which a top end of the receiving hole of the bolt pin must be in tight engagement with the upper lid can be alleviated, and various issues related to contact between the top end of the circuit device and the upper lid can be removed to thereby effectively lower down the production cost of an electronic seal and improve yield.

(2) An effect of coupling feed can be established between the radiation unit and a bottom of the hole body. Accordingly, when a lower portion of the bolt pin inserts into and locks up a locking hole of the bolt seat to have the circuit device electrically connected with a lower monopole antenna of the bolt seat, the upper and lower monopole antennas jointly form a standard dipole antenna, and thus, the entirety of operation of the present invention surely provides an antenna gain over the prior art device and sufficing to alleviate the issue of poor performance of the top end of the circuit device of the prior art device electrically connecting with the upper lid.

DETAILED DESCRIPTION OF THE PREFERRED EMBODIMENT

Figure 1:
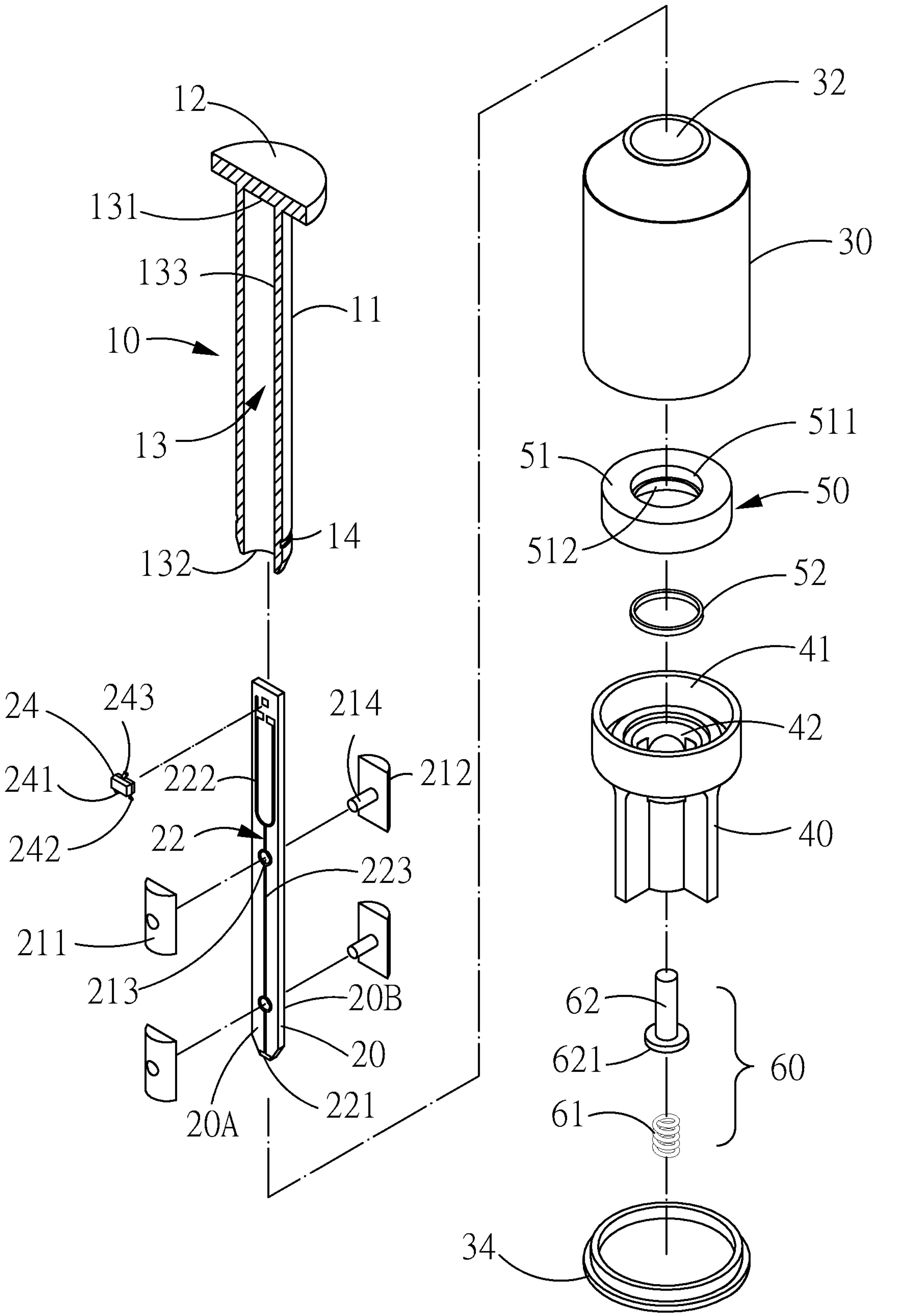
FIG. 1 is an exploded view of the present invention.
Figure 2:
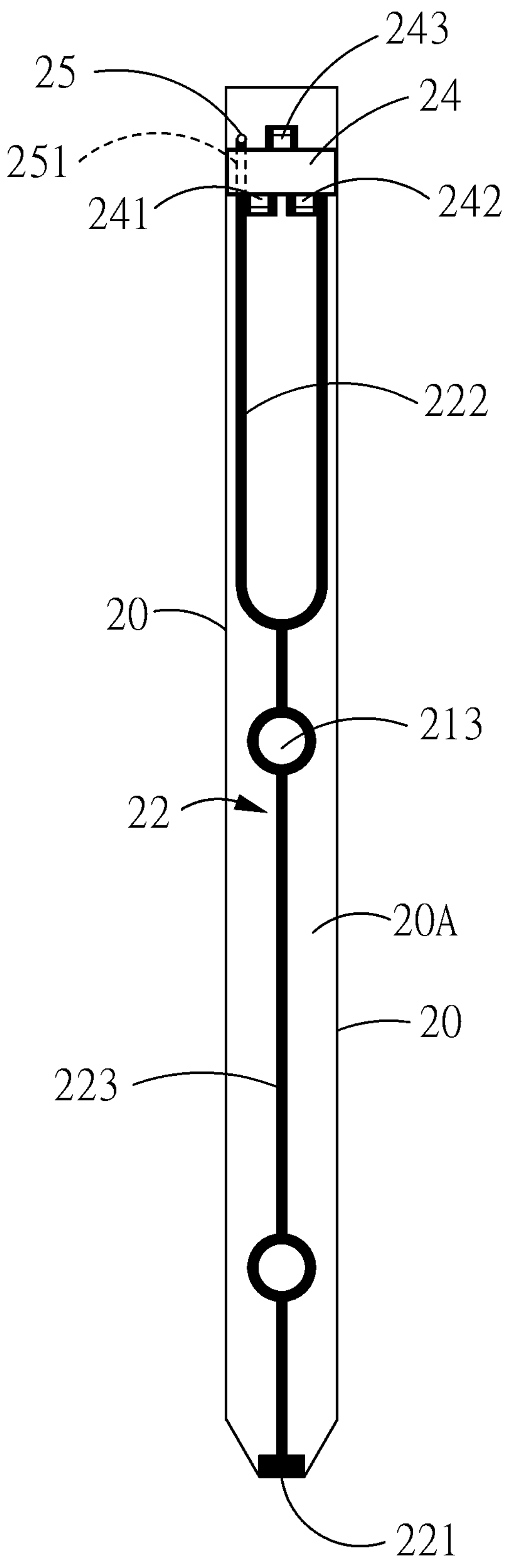
FIG. 2 is a schematic front view showing a circuit device of the present invention.
Figure 3:
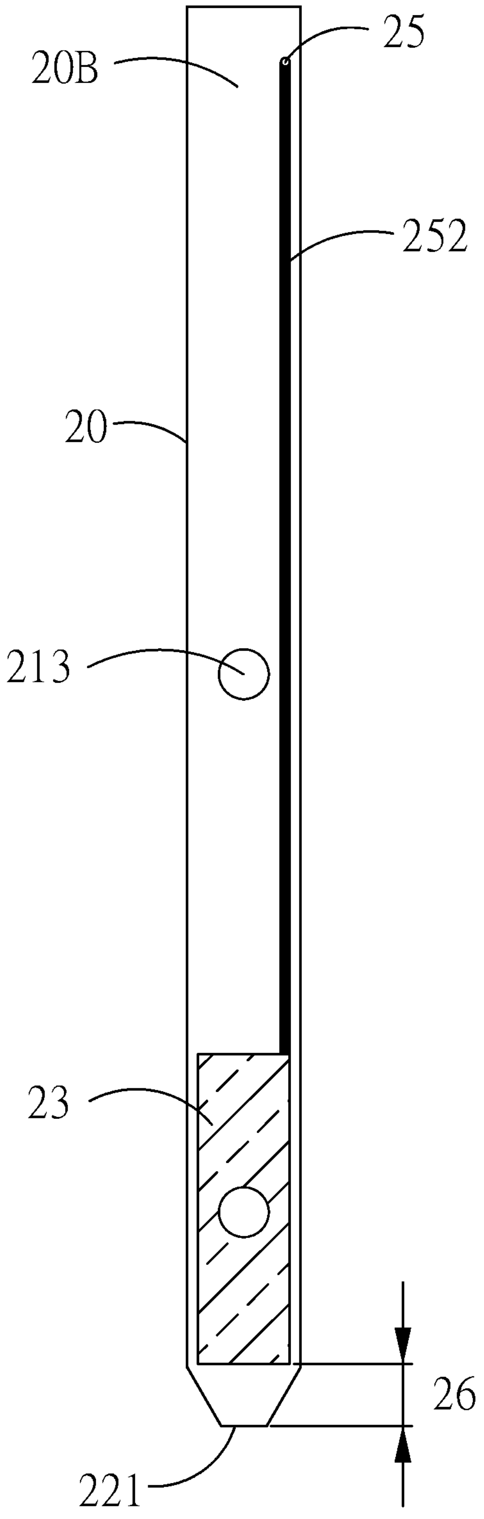
FIG. 3 is a schematic rear view showing the circuit device of the present invention.
Figure 4:
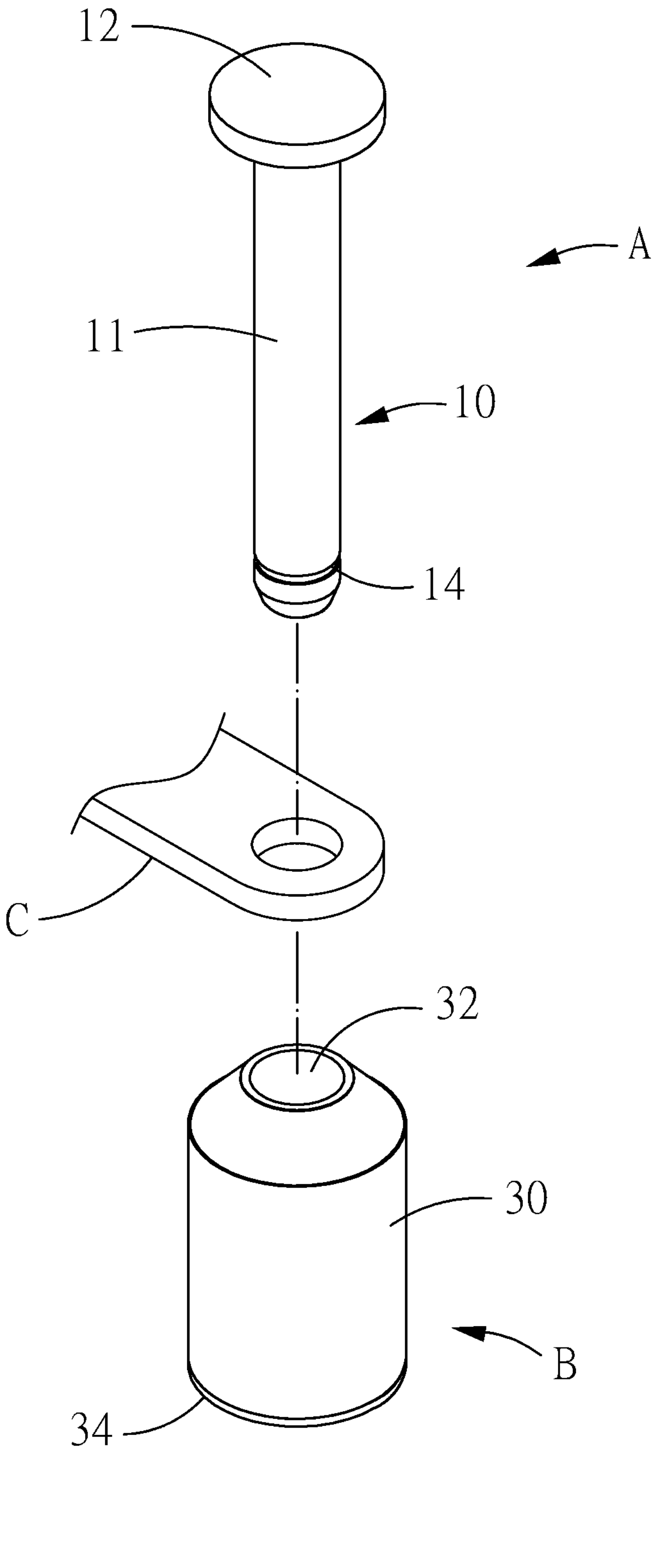
FIG. 4 is a schematic view showing relative positions among a bolt plug, a bolt seat, and a door latch according to the present invention.
Figure 5:
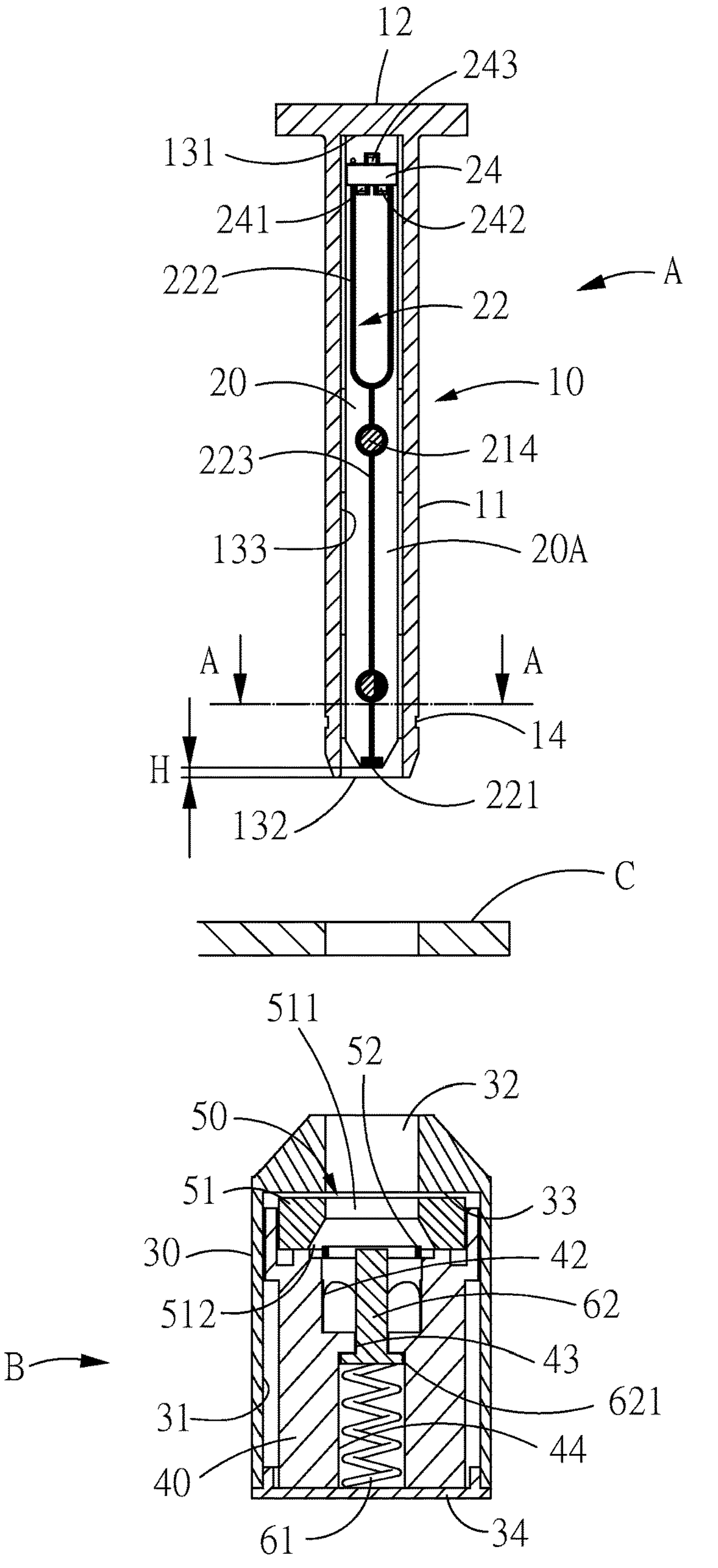
FIG. 5 is a cross-sectional view of FIG. 4.
Figure 6:
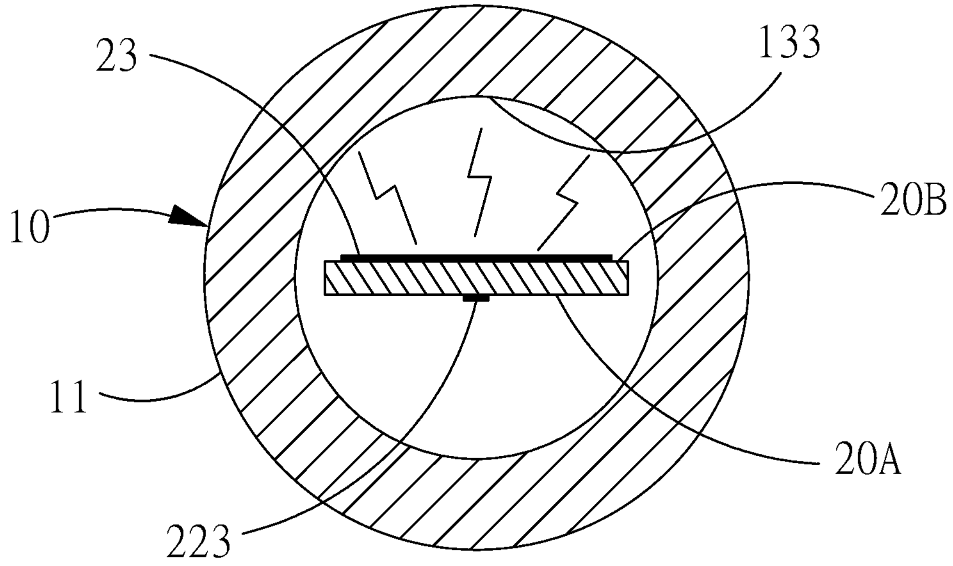
FIG. 6 is a cross-sectional view taken along line A-A of FIG. 5.

As shown in FIG. 4, an electronic seal according to the present invention is formed of a plug bolt A and a bolt seat B. The plug bolt A is operable or manipulatable, in a direction from top to bottom, to lock up the bolt seat B for being thereby mounted on a door latch C to close a movable door panel of a cargo container, so that a host device installed in a custom house or a warehouse may monitor if the movable door panel is normally opened during clearing through the custom to thereby identify if theft has occurred.

Referring to FIGS. 1-7, the plug bolt A comprises a bolt pin 10 having an interior in which a circuit device 20 is mounted.

The bolt pin 10 is made of an electrically conductive metallic material and comprises a rod body 11, a cap head 12 that is radially expanded and formed on a top end of the rod body 11, a receiving hole 13 that has an opening facing downward, and an upper buckle 14 that is formed through circumferentially recessing an outer circumference of a lower portion of the rod body 11. The receiving hole 13 is arranged in an axial direction of the rod body 11 and has a closed hole top 131, an open hole bottom 132, and a hole body 133 intermediating between the hole top 131 and the hole bottom 132. The hole bottom 132 communicates inside and outside of a bottom of the hole body 133.

The circuit device 20 defines a front surface 20A and a rear surface 20B that is opposite to the front surface 20A and is sized to insert, in a direction from bottom to top, into the receiving hole 13 and thus, fixed in the hole body 133 in a manner of being completely and internally concealed. The fixing is achieve in such a way that a male plug member 211 is arranged between the front surface 20A and one side of the hole body 133 and a female plug member 212 is arranged between the rear surface 20B and an opposite side of the hole body 133, and the circuit device 20 is formed with a through aperture 213, so that a pin member 214 fixes the male plug member 211 and the female plug member 212 on the circuit device 20, and the male plug member 211 and the female plug member 212 are clamped in a radial direction by the hole body 133 to thereby hold and securely fix the circuit device 20.

The circuit device 20 comprises a main circuit 22 arranged on the front surface 20A and a radiation unit 23 that is made in the form of a planar surface arranged on a bottom portion of the rear surface 20B. The main circuit 22 comprises a lower contact point 221 arranged on a bottom end of the circuit device 20, a matching circuit 222 arranged on a top portion of the circuit device 20, and a bridging circuit 223 arranged between the lower contact point 221 and a middle of the matching circuit 222, so that the matching circuit 222 and the bridging circuit 223 are distributed on a portion of the rod body 11 of a wide range in a longitudinal direction. Consequently, when the rod body 11 is cut off, the main circuit 22 is also broken in order to suit the need for detachability from the door latch C. Further, the present invention is structured so as to have the circuit device 20 fixed in the receiving hole 13 in a manner of being completely and internally concealed therein to thereby form and maintain a fitting zone H between the lower contact point 221 and the bottom of the receiving hole 13 to facilitate operations to be described hereinafter. The main circuit 22 and the radiation unit 23 are electrically connected to a radio-frequency identification (RFID) chip 24 to form a radio frequency circuit. The RFID chip 24 is arranged on a top of the front surface 20A and comprises a primary signal pin 241 connected to one end of the matching circuit 222, a secondary signal pin 242 connected to another end of the matching circuit 222, and a retaining pin 243 that provides additional supporting.

The circuit device 20 is formed with a conducting portion 25 in the form of a hole penetrating through a top portion thereof. The conducting portion is extended, from a front end thereof, to form a front lead wire 251 connected to said one end of the matching circuit 222, and the conducting portion 25 is further extended, from a rear end thereof, to form a rear lead wire 252 connected to the radiation unit 23 to provide electrical connection among the RFID chip 24, the main circuit 22, and the radiation unit 23 and also to control formation of a separation zone 26 between the radiation unit 23 and the lower contact point 221 illustrated in FIG. 3 to prevent short-circuiting between the radiation unit 23 and the lower contact point 221, and it is particularly noted here that the main circuit 22, the RFID chip 24, and the conducting portion 25 are not allowed to directly electrically contact the bolt pin 10 in order to prevent emission of signals due to erroneous contact between the circuit device 20 and the bolt pin 10. The present invention mainly controls a surface area parameter of the radiation unit 23 that is in the form of a planar surface and a relative position parameter of being located in the receiving hole 13 to make the radiation unit 23 inducing a coupling feed effect with respect to the hole body 133 in a manner of being not in contact engagement with the hole body 133 by means of which the bolt pin 10 forms an upper monopole antenna for the circuit device 20. The coupling feed effect is not a capacitive energy accumulation effect adopted in ordinary electronic circuits and is instead using a frequency response generated by the radiation unit 23 and the hole body 133 to achieve coupling feeding of signals of a radio-frequency circuit to transmit electromagnetic signals for realizing electrical connection with the hole body 133 of the bolt pin 10, and under this condition, the upper monopole antenna has only a relative low gain and cannot effectively activate the RFID chip 24. It is particularly noted herein that when the surface area of the radiation unit 23 exceeds the surface area parameter, it will directly induce an antenna effect, and at this moment, signals of the RFID chip 24 will be blocked inside the metallic receiving hole 13 and receiving and transmission of signals through the bolt pin 10 are not possible. Further, when the surface area of the radiation unit 23 is smaller than the surface area parameter, the radiation unit 23 cannot induce a frequency response with respect to the bolt pin 10, and consequently, it is also impossible to transmit and receive signals through the bolt pin 10.

The bolt seat B is formed of a housing 30, a base 40, a lower buckle 50, and a lower monopole antenna 60.

The housing 30 is generally of a cylindrical form and comprises a compartment 31 that is formed through being recessed in direction from bottom to top and a locking hole 32 that extends outwards from a top end of the compartment 31. A hole diameter of the locking hole 32 is large enough to receive a lower portion of the bolt pin 10 to insert therein and is smaller than an internal diameter of the compartment 31, so that a shoulder 33 is formed in the top end of the compartment 31. A bottom end of the compartment 31 is closed by mounting a bottom lid 34 thereto.

The base 40 is fixed in the compartment 31 and is positioned between the shoulder 33 and the bottom lid 34. The base 40 is formed with, in sequence from top to bottom, a first hole 41, a second hole 42, a third hole 43, and a fourth hole 44 that are in communication with each other and are coaxial with the locking hole 32. A hole diameter of the second hole 42 is set to correspond to the hole diameter of the locking hole 32 to receive the bottom end of the bolt pin 10 to insert therein. A hole diameter of the first hole 41 is greater than the hole diameter of the second hole 42 to receive the lower buckle 50, which will be described later, to be disposed therein. Further, a hole diameter of the third hole 43 is set to be smaller than the hole diameter of the second hole 42, and a hole diameter of the fourth hole 44 is larger than the hole diameter of the third hole 43. The third hole 43 and the fourth hole 44 may receive the lower monopole antenna 60, which will be further described later, to be mounted therein.

The lower buckle 50 is formed of a stop ring 51 and a clip ring 52. The stop ring 51 is located in the first hole 41 and has a top end positioned on the shoulder 33, and is formed with a fifth hole 511 that receives the bottom end of the bolt pin 10 to pass therethrough. A bottom of the fifth hole 511 is set in communication with and coaxial with a taper hole 512. The taper hole 512 has a hole diameter that is arranged to diverge in a downward direction. The clip ring 52 is mounted in a range of the taper hole 512 and has an external diameter that is greater than the second hole 42 and is arranged to form, when positioned opposite to the upper buckle 14, buckling engagement therewith, so that the clip ring 52 may prevent the bolt pin 10 from separating from the bolt seat B.

The lower monopole antenna 60 is formed of a spring 61 disposed in the fourth hole 44 and a slide block 62 slidably disposed in the third hole 43. The spring 61 is supported between and in contact engagement with the bottom lid 34 and a bottom of the slide block 62. The bottom of the slide block 62 is outward expanded in a radial direction to form a flange 621, and the spring 61 provides a preloading force acting on the slide block 62 to bias the flange 621 of the slide block 62 to be positioned against and constrained by a top end of the fourth hole 44 in order to maintain a top end of the slide block 62 to suspend in the interior of the second hole 42 for inserting into and fitting in the fitting zone H to match with the lower contact point 221.

Figure 7:
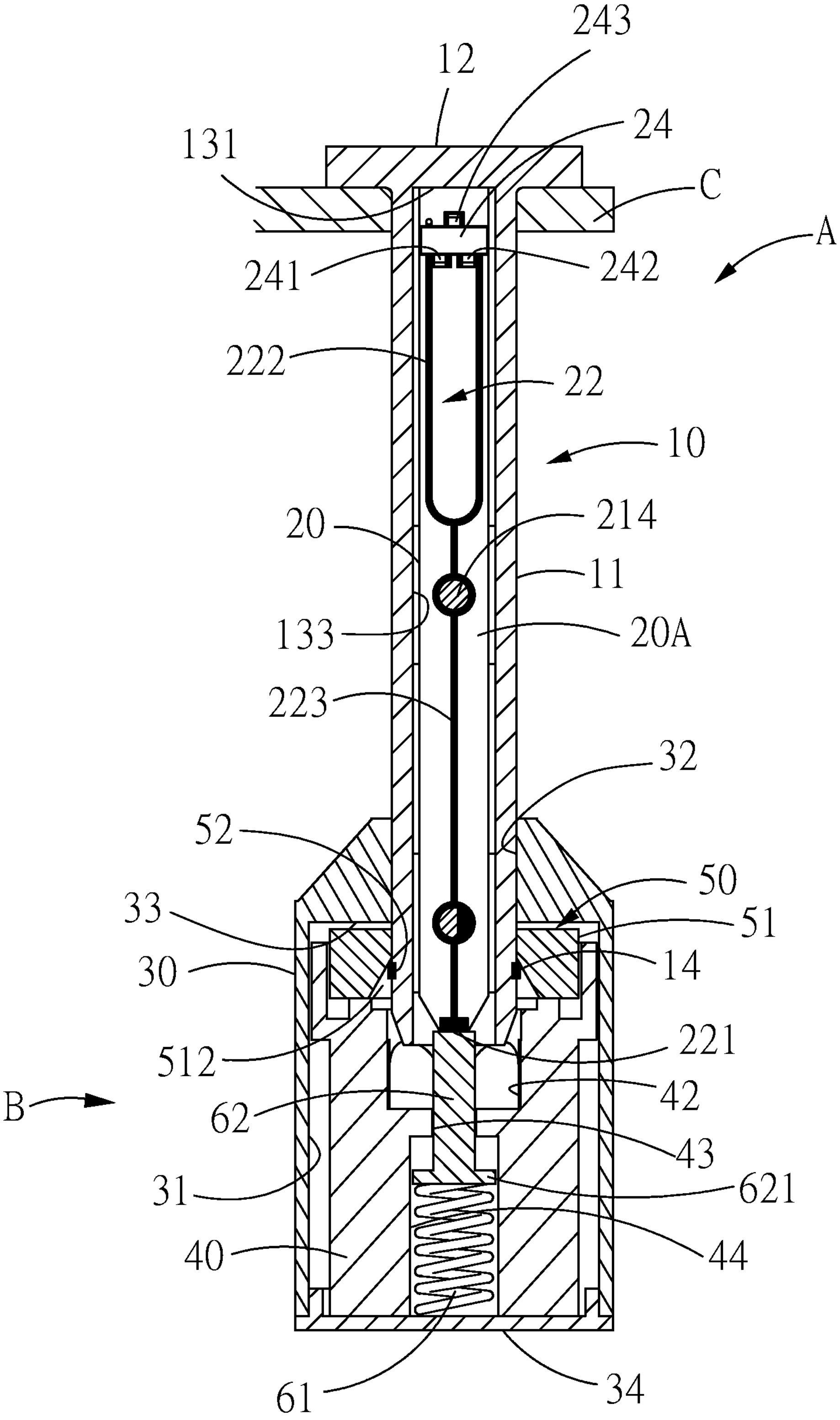
FIG. 7 is an assembled view of FIG. 5.
Figure 8:
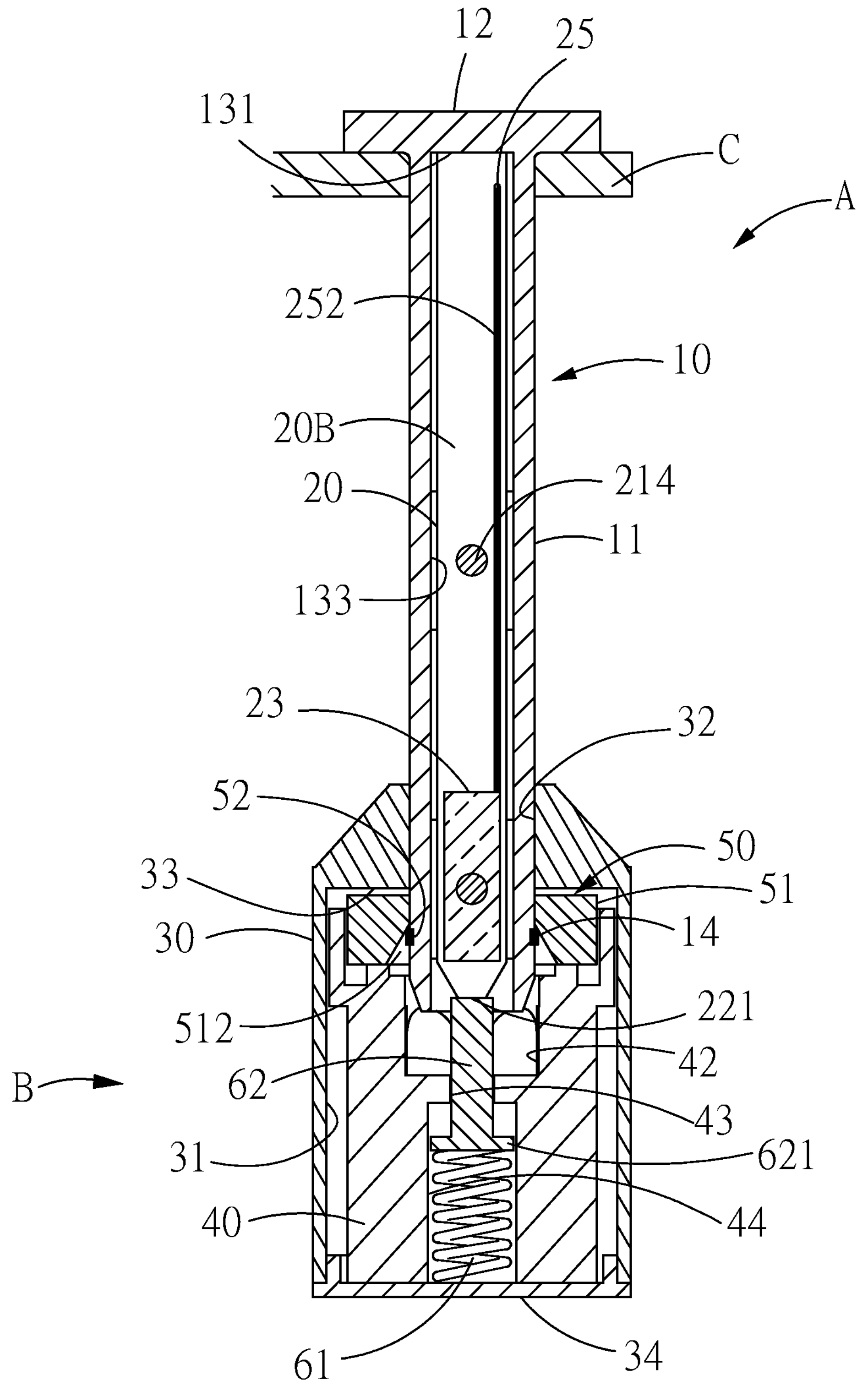
FIG. 8 is a schematic view showing a position of a radiation unit when the bolt plug and the bolt seat according to the present invention are locked together.
Figure 9:
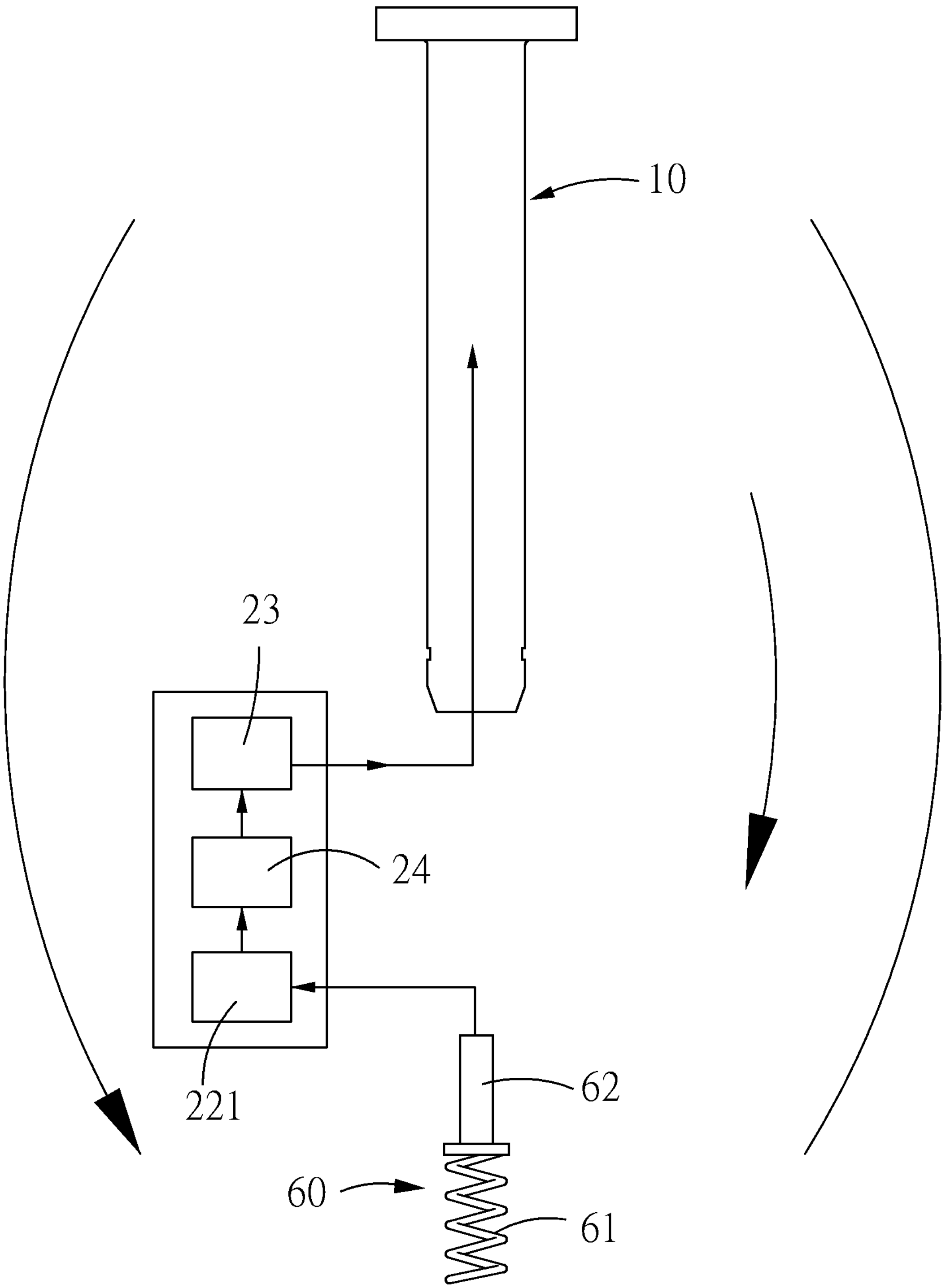
FIG. 9 is a schematic view illustrating operation of electromagnetic wave in a standard dipole antenna mode formed of the present invention.

Referring to FIGS. 4-7, when the lower portion of the bolt pin 10 is to be inserted into the locking hole 32 for mounting to the door latch C, during the course of the lower portion of the bolt pin 10 being continuously inserted into the locking hole 32, the top end of the slide block 62 is caused to move into the fitting zone H to contact the lower contact point 221, and subsequently, the lower portion of the bolt pin 10 is forced to overcome the preloading of the spring 61 to further insert into the locking hole 32 to allow the upper buckle 14 to get into retaining engagement with and positioned in the lower buckle 50 to thereby have the bolt pin 10 locked up with the bolt seat B without departing therefrom, and the top end of the slide block 62 set and kept in electrical connection with the lower contact point 221, so that the spring 61 and the slide block 62 jointly form the lower monopole antenna 60 that may activate the RFID chip 24 for gain enhancement for the upper monopole antenna, and therefore, the upper monopole antenna and the lower monopole antenna 60 are combined to form a standard dipole antennal as shown in FIGS. 8 and 9, which is capable of emitting a signal of an RFID frequency band or a microwave frequency band identifiable and manageable by the host device to thereby ensure effective monitoring and controlling of closure of the movable door panel. To opening the movable door panel in a normal way, hydraulic scissors are applied to cut off the bolt pin 10 at a middle portion to break up the main circuit 22 and thus terminating the signal. It is particularly noted here that the present invention is equally operable in a way as to application of the coupling feed effect between the radiation unit 23 and the hole body 133 by controlling setting of a surface parameter and setting of a distance parameter of the lower contact point 221 and the top end of the lower monopole antenna 60, so as to, when the bolt pin 10 locks up the bolt seat B, control the lower contact point 221 and the top end of the lower monopole antenna 60 to induce a coupling feed effect without being put in contact with each other, to allow the lower contact point 221 to transmit an electromagnetic wave signal to the top end of the lower monopole antenna 60 for mutual electrical connection therebetween.

The present invention provides the following advantages:

(1) The present invention provides that the radiation unit is so set as to generate an effect of coupling feed with respect to a hole body of the bolt pin for transmission of an electromagnetic wave signal, making the bolt pin forming an upper monopole antenna of the circuit device. Such a technology can be implemented without the circuit device in direct electrical connection with the bolt pin thereby achieving simplification over a separation and recontact structure between the circuit device and the upper lid as provided in the prior art device, and also eliminating the necessity of the bolt pin of the prior art device being surely closing the upper lid. Thus, the present invention is of better economic performance than the prior art.

(2) Referring to FIGS. 8 and 9, the present invention enables easy control of an effect of coupling feed induced between the radiation unit and a lower edge of the hole body and making the bolt pin form an upper monopole antenna, which when energized and used in combination with the lower monopole antenna, forms a standard dipole antenna mode. Oppositely, the prior art device provides the top end of the circuit device electrically connecting with the upper lid, and this being impossible to form a standard dipole antenna. Thus, the dipole antenna formed according to the present invention surely provides a high antenna gain and exhibits a better reading or accessing distance.

(3) In addition to the lower contact point of the circuit device being completely and internally concealed in the receiving hole of the bolt pin, the present invention further provides a fitting zone being arranged between the lower contact point and a bottom of the receiving hole. This arrangement effectively eliminates the drawbacks of the prior art device that the circuit device can be easily pulled out and signals mistakenly issued by erroneous contact. Further, during the course of the bolt pin inserting into and locking up the bolt seat, the top end of the lower monopole antenna is controlled to enter the fitting zone, making the lower monopole antenna electrically connected with the lower contact point. Such an overall arrangement is quite reasonable and demonstrates high industrial utilization and improvement.

To further improve the identifiability of the present invention, it is feasible to add a second RFID chip at a proper location and to maintain the second RFID chip and the circuit device constantly in electrical connection, so that when the bolt pin is broken by hydraulic scissors to interrupt a signal of the RFID chip 24 shown in FIG. 7, the second RFID chip still emits a comparison signal, so that an operator may easily identify whether or not the electronic seal is destructed or malfunctioning.

I claim:

1. A coupling electronic seal, at least comprising:

a plug bolt, which comprises a bolt pin and a circuit device, the bolt pin comprising an upper buckle and a receiving hole in which the circuit device is disposed, the receiving hole defining a hole body arranged in an axial direction and also defining a hole bottom in a bottom of the hole body to communicate inside and outside, the circuit device comprising a radio-frequency identification (RFID) chip and also comprising a main circuit and a radiation unit in electrical connection with the RFID chip, the main circuit comprising a lower contact point, the radiation unit being arranged to generate an effect of coupling feed with respect to the hole body of the bolt pin so as to make the bolt pin forming an upper monopole antenna of the circuit device; and a bolt seat, in which a lower monopole antenna is arranged and which is formed with a locking hole into which a lower portion of the bolt pin is insertable and is provided with a lower buckle for positioning of the upper buckle, so that the bolt pin is manipulatable to lock up with the bolt seat to control electrical connection between the lower monopole antenna and the lower contact point so as to activate the RFID chip, and the upper monopole antenna and the lower monopole antenna jointly form a dipole antenna.

2. The coupling electronic seal according to claim 1, wherein the radiation unit is arranged in the form of a planar surface and the effect of coupling feed is generated by means of the radiation unit inducing a frequency response, in a manner of being not in contact with the hole body, with respect to the hole body through controlling a surface area parameter of the radiation unit and a relative position parameter thereof in the receiving hole.

3. The coupling electronic seal according to claim 1, wherein the radiation unit induces the effect of coupling feed with respect to a lower edge of the hole body so that the upper monopole antenna and the lower monopole antenna, when energized, form a dipole antenna of a standard arrangement.

4. The coupling electronic seal according to claim 1, wherein the circuit device defines a front surface and a rear surface opposite to the front surface; the main circuit is arranged on the front surface, the main circuit comprising the lower contact point arranged on a bottom end of the circuit device; and the radiation unit is arranged on the rear surface and a separation zone is formed between the radiation unit and the lower contact point.

5. The coupling electronic seal according to claim 2, wherein the circuit device defines a front surface and a rear surface opposite to the front surface; the main circuit is arranged on the front surface, the main circuit comprising the lower contact point arranged on a bottom end of the circuit device; and the radiation unit is arranged on the rear surface and a separation zone is formed between the radiation unit and the lower contact point.

6. The coupling electronic seal according to claim 3, wherein the circuit device defines a front surface and a rear surface opposite to the front surface; the main circuit is arranged on the front surface, the main circuit comprising the lower contact point arranged on a bottom end of the circuit device; and the radiation unit is arranged on the rear surface and a separation zone is formed between the radiation unit and the lower contact point.

7. The coupling electronic seal according to claim 1, wherein the lower contact point and a top end of the lower monopole antenna are arranged such that the lower contact point and the top end of the lower monopole antenna are controlled by means of setting of a surface area parameter and setting of a distance parameter to generate the effect of coupling feed, in a manner of being not in contact engagement with each other, so as to be in electrical connection with each other when the bolt pin locks up the bolt seat.

8. The coupling electronic seal according to claim 2, wherein the lower contact point and a top end of the lower monopole antenna are arranged such that the lower contact point and the top end of the lower monopole antenna are controlled by means of setting of a surface area parameter and setting of a distance parameter to generate the effect of coupling feed, in a manner of being not in contact engagement with each other, so as to be in electrical connection with each other when the bolt pin locks up the bolt seat.

9. The coupling electronic seal according to claim 3, wherein the lower contact point and a top end of the lower monopole antenna are arranged such that the lower contact point and the top end of the lower monopole antenna are controlled by means of setting of a surface area parameter and setting of a distance parameter to generate the effect of coupling feed, in a manner of being not in contact engagement with each other, so as to be in electrical connection with each other when the bolt pin locks up the bolt seat.

10. The coupling electronic seal according to claim 1, wherein a fitting zone is arranged between the lower contact point and the hole bottom, and a top end of the lower monopole antenna is positioned, in a suspended manner, in the bolt seat, so that when the bolt pin locks up the bolt seat, the top end of lower monopole antenna is movable to pass through the fitting zone to electrically connect the lower contact point.

11. The coupling electronic seal according to claim 2, wherein a fitting zone is arranged between the lower contact point and the hole bottom, and a top end of the lower monopole antenna is positioned, in a suspended manner, in the bolt seat, so that when the bolt pin locks up the bolt seat, the top end of lower monopole antenna is movable to pass through the fitting zone to electrically connect the lower contact point.

12. The coupling electronic seal according to claim 3, wherein a fitting zone is arranged between the lower contact point and the hole bottom, and a top end of the lower monopole antenna is positioned, in a suspended manner, in the bolt seat, so that when the bolt pin locks up the bolt seat, the top end of lower monopole antenna is movable to pass through the fitting zone to electrically connect the lower contact point.

* * * * *